(12) United States Patent
Liao et al.

(10) Patent No.: US 9,963,257 B2
(45) Date of Patent: May 8, 2018

(54) INJECTION DEVICE FOR DIESEL EXHAUST FLUID

(71) Applicants: Ying-Chieh Liao, Taichung (TW);
Yu-Kuo Liao, Taichung (TW)

(72) Inventors: Ying-Chieh Liao, Taichung (TW);
Yu-Kuo Liao, Taichung (TW)

( * ) Notice: Subject to any disclaimer, the term of this patent is extended or adjusted under 35 U.S.C. 154(b) by 0 days. days.

(21) Appl. No.: 15/287,017

(22) Filed: Oct. 6, 2016

(65) Prior Publication Data

US 2018/0100418 A1   Apr. 12, 2018

(51) Int. Cl.
*B65B 39/00* (2006.01)
*F16L 15/00* (2006.01)
*F16L 21/02* (2006.01)
*B67C 11/04* (2006.01)
*F01N 3/20* (2006.01)

(52) U.S. Cl.
CPC .......... *B65B 39/004* (2013.01); *B67C 11/04* (2013.01); *F16L 15/006* (2013.01); *F16L 21/02* (2013.01); *F01N 3/206* (2013.01); *F01N 2610/142* (2013.01); *F01N 2610/1413* (2013.01); *F01N 2610/1466* (2013.01)

(58) Field of Classification Search
CPC ..... B65B 39/001; B65B 39/004; B65B 39/04; B67C 11/04; B67C 2011/20; B67C 2011/30; F16L 21/02; F01N 2610/1413; F01N 3/206

See application file for complete search history.

(56) References Cited

U.S. PATENT DOCUMENTS

| | | | | | |
|---|---|---|---|---|---|
| 2,526,784 | A | * | 10/1950 | Walker | G01F 23/66 141/344 |
| 3,850,190 | A | * | 11/1974 | Carlson | F16K 15/144 137/218 |
| 3,885,608 | A | * | 5/1975 | Ayres | B67D 7/38 137/383 |
| 3,938,563 | A | * | 2/1976 | Gall | B67C 11/04 141/298 |
| 4,593,720 | A | * | 6/1986 | Bergandy | B65B 39/001 137/496 |
| 7,350,546 | B2 | * | 4/2008 | Stavrakis | B67C 3/26 141/386 |
| 7,591,289 | B1 | * | 9/2009 | Hamada | F01P 11/028 141/290 |
| 7,757,728 | B2 | * | 7/2010 | Gruber | B67C 11/066 141/201 |

(Continued)

*Primary Examiner* — Timothy L Maust
*Assistant Examiner* — Andrew StClair
(74) *Attorney, Agent, or Firm* — Muncy, Geissler, Olds & Lowe PC

(57) ABSTRACT

An injection device for diesel exhaust fluid includes a cylinder, a stopper, and an air tube. The cylinder encloses a receiving space. The cylinder has an opening at the bottom end. The stopper is pipe-shaped and has a stopping portion and a top portion at two opposite ends thereof. The stopper is arranged in the receiving space and is movable along the longitudinal direction of the cylinder. the stopping portion selectively plugs the opening of the cylinder so that fluid in the receiving space is unable to flow out via the opening. The air tube is inserted through the stopper and the opening of the cylinder to communicate with exterior. The air tube is positioned to the cylinder near the opening so that the air tube may not move with the stopper.

7 Claims, 6 Drawing Sheets

(56) References Cited

U.S. PATENT DOCUMENTS

2005/0098229 A1\* 5/2005 Stavrakis ................ B67C 3/28
 141/144
2015/0013841 A1\* 1/2015 Lin ........................ B67C 11/04
 141/345

\* cited by examiner

US 9,963,257 B2

INJECTION DEVICE FOR DIESEL EXHAUST FLUID

BACKGROUND OF THE INVENTION

Field of the Invention

The present invention relates to an injection device for diesel exhaust fluid.

Description of the Prior Art

Generally, diesel exhaust fluid (DEF) is necessary for diesel vehicles to transfer exhaust into nitrogen which is more environment-friendly. The diesel exhaust fluid is usually stored in a specific tank and needs to be replenished.

To replenish the DEF, the conventional way is to place a funnel on the opening neck of the tank, and to directly pour the DEF into the tank. However, if the position of the tank makes it difficult to place the funnel, replenishing the DEF becomes difficult.

Thus, some injection cylinders are used for injecting the DEF. Most injection cylinders only have a single switch, and the switch is operated by rotating. That is, the user has to rotate the switch for a while, and the user must have enough strength to rotate it. Also, it is difficult to completely tighten the switch. Besides, to discharge the air in the tank, the injection cylinder may not cover the opening of the tank completely, so the injection cylinder may be accidentally removed from the tank to result the fluid leaking.

SUMMARY OF THE INVENTION

The main object of the present invention is to provide an injection device for diesel exhaust fluid which is easy to operate and keeps ventilation.

To achieve the above and other objects, an injection device for diesel exhaust fluid of the present invention includes a cylinder, a stopper, and an air tube.

The cylinder encloses a receiving space and has a top end and a bottom end. The cylinder has an opening at the bottom end. A longitudinal direction is defined by the top end and the bottom end. The stopper is hollow and pipe-shaped and has a stopping portion and a top portion at two opposite ends thereof. The stopper is arranged in the receiving space and is movable along the longitudinal direction. The stopping portion selectively plugs the opening of the cylinder so that fluid in the receiving space is unable to flow out via the opening. The air tube is inserted through the stopper and the opening of the cylinder to communicate with exterior. The air tube is positioned to a portion of the cylinder near the opening so that the air tube does not move with the stopper.

Thereby, the simple structure of the present invention is easy to operate, and the air is still able to be discharged even if the cylinder is stopped.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
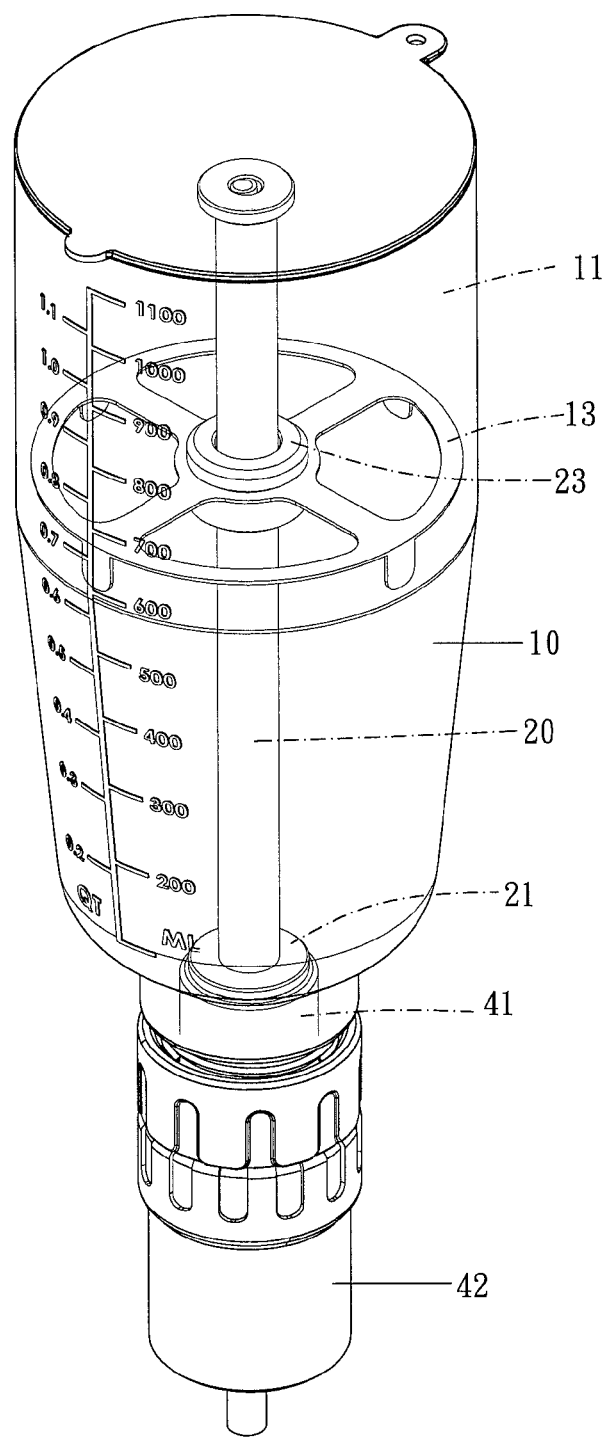
FIG. 1 is a stereogram of the present invention.
Figure 2:
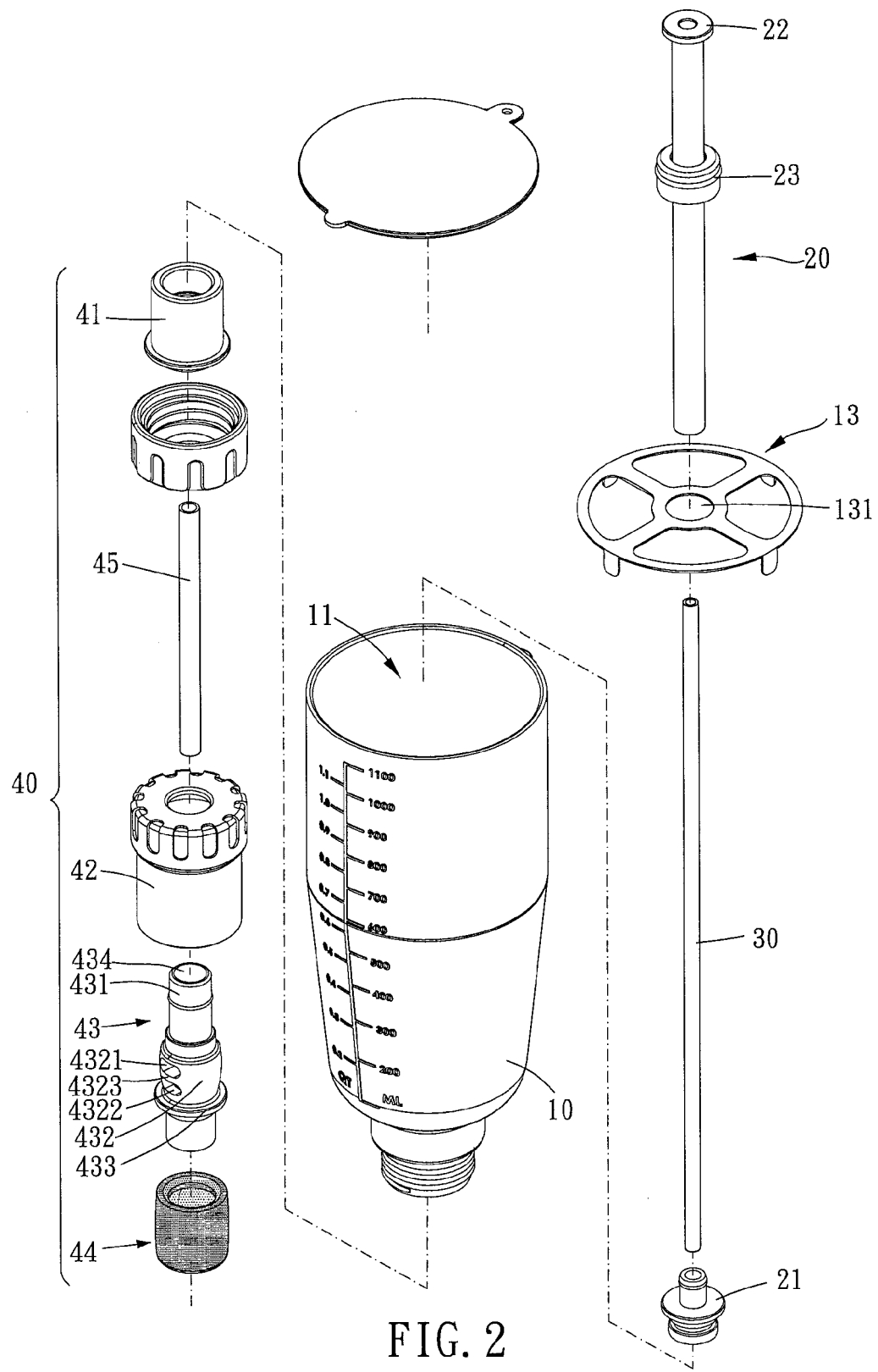
FIG. 2 is a breakdown drawing of the present invention.

Please refer to FIG. 1 to FIG. 6, the injection device for diesel exhaust fluid of the present invention includes a cylinder 10, a stopper 20, and an air tube 30.

The cylinder 10 encloses a receiving space 11 and has a top end and a bottom end. The cylinder 10 has an opening at the bottom end. A longitudinal direction is defined by linking the top end and the bottom end. The stopper 20 is hollow and pipe-shaped and has a stopping portion 21 and a top portion 22 at two opposite ends thereof. The stopper 20 is arranged in the receiving space 11 and is movable along the longitudinal direction. The stopping portion 21 selectively plugs the opening of the cylinder 10 so that fluid in the receiving space 11 is unable to flow out via the opening. The air tube 30 is inserted through the stopper 20 and the opening of the cylinder 10 to communicate with exterior. The air tube 30 is positioned to a portion of the cylinder 10 near the opening so that the air tube 30 does not move with the stopper 20. A restriction rack 13 can be also included. The restriction rack 13 is formed with a restriction hole 131 on a center thereof. A restriction portion 23 is sleeved onto the stopper 20. The restriction portion 23 plugs the restriction hole 131 and is positioned in the restriction hole 131. The stopper 20 is slidable with respect to the restriction portion 23. Preferably, the lower half of the cylinder 10 is tapered downward so that the restriction rack 13 can be placed on the inner wall of the cylinder 10.

In the present embodiment, a connector 40 is further included. The connector 40 is arranged at the opening of the cylinder 10. The stopping portion 21 of the stopper 20 selectively plugs the connector 40. More specifically, the connector 40 includes a sleeve member 41, a tube member 43, an elastic sleeve 44, a guiding tube 45, and an outer sleeve 42. The sleeve member 41 is tube-shaped to plug in the opening of the cylinder 10. A top portion of the sleeve member 41 is adapted for the stopping portion 21 of the stopper 20 to plug. The tube member 43 is tube-shaped and has an insertion section 431 and a pushing section 433 at two opposite ends thereof. The tube member 43 further has a hole section 432 between the insertion section 431 and the pushing section 433. The insertion section 431 is inserted into a bottom portion of the sleeve member 41. The hole section 432 is formed with at least one outlet hole 4321 and at least one inlet hole 4322. The outlet hole 4321 is closer to the insertion section 431 than the inlet hole 4322 is, and the inlet hole 4322 is closer to the pushing section 433 than the outlet hole 4321 is. The hole section 432 has a partitioning plate 4323 therein between the outlet hole 4321 and the inlet hole 4322. The partitioning plate 4323 is forming with a through hole 4324 at a center thereof. The guiding tube 45 is inserted through and positioned to the through hole 4324. The air tube 30 is inserted through the guiding tube 45. An upper channel 434 is defined in the insertion section 431, and a lower channel 435 is defined in the pushing section 432. The upper channel 434 communicates with the outlet hole 4321, and the lower channel 435 communicates with the inlet hole 4322. The elastic sleeve 44 is hollow. An intermediate portion of the elastic sleeve 44 is deformable outward when a force along a longitudinal direction of the elastic sleeve 44 is applied to it. The elastic sleeve 44 is sleeved onto the hole section 433 of the tube member 43 to block the outlet hole 4321 and the inlet hole 4322. An end of the elastic sleeve 44 abuts against the pushing section 433 of the tube member 43. The outer sleeve 42 is sleeved onto the tube member 43 and the elastic sleeve 44. When an opening neck 51 of a container 50 is inserted into the outer sleeve 42 to push the pushing section 433 toward the cylinder 10, the elastic sleeve 44 is deformed to release the outlet hole 4321 and the inlet hole 4322 so that the outlet hole 4321 communicates with the inlet hole 4322 via a gap between the elastic sleeve 44 and the tube member 43. Preferably, an inner wall of an end of the outer sleeve 42 away from the cylinder 10 is formed with internal threads 421 to be screwed with the external threads 511 on the opening neck 51 of the container 50. The pushing section 433 has an annular flange, and an end of the elastic sleeve 44 abuts against the annular flange. An inner wall of the elastic sleeve 44 is substantially sphere-shaped and is made of rubber. In other words, the elastic sleeve 44 has an intermediate section whose diameter larger than those of an upper section and a lower section of the elastic sleeve 44. The intermediate section corresponds to the hole section 432 of the tube member 43. Besides, the guiding tube 45 extends to the top portion of the sleeve member 41. A bottom of the stopping portion 21 of the stopper 20 is formed with an annular groove. The annular groove surrounds the air tube 30. When the stopper 20 plugs the sleeve member 41, the guiding tube 45 is inserted into the annular groove.

Figure 3:
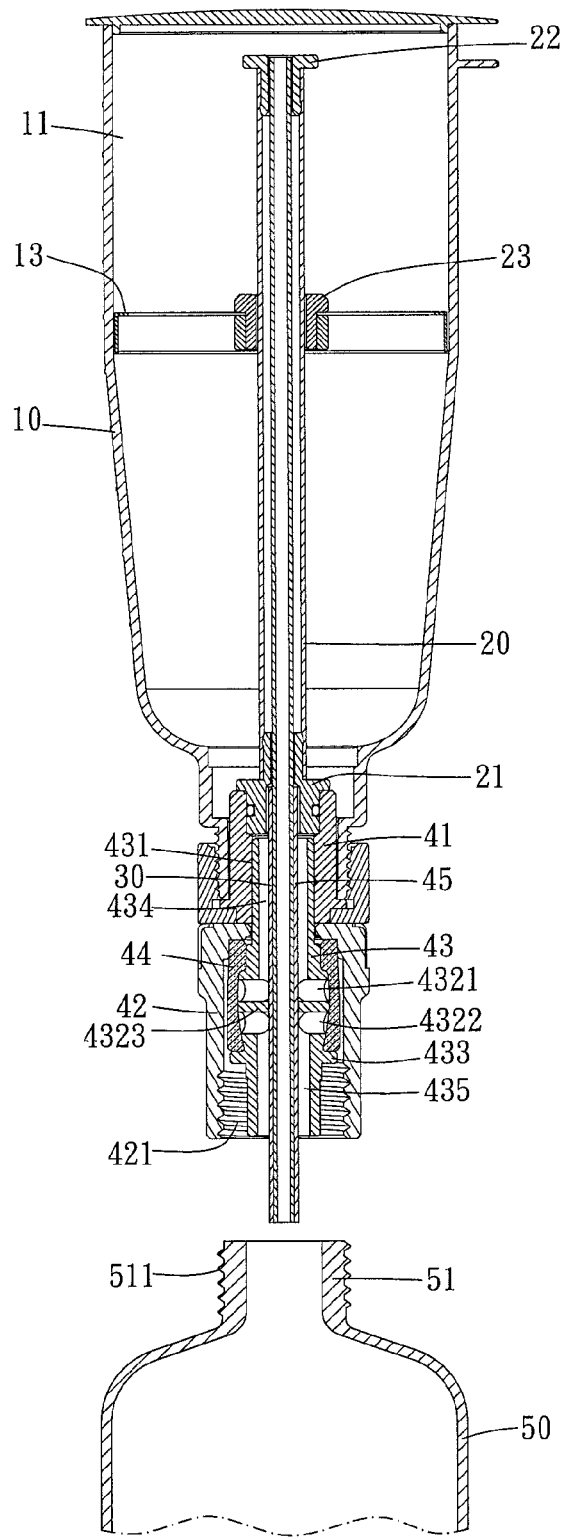
FIG. 3 is a profile of the present invention.
Figure 4:
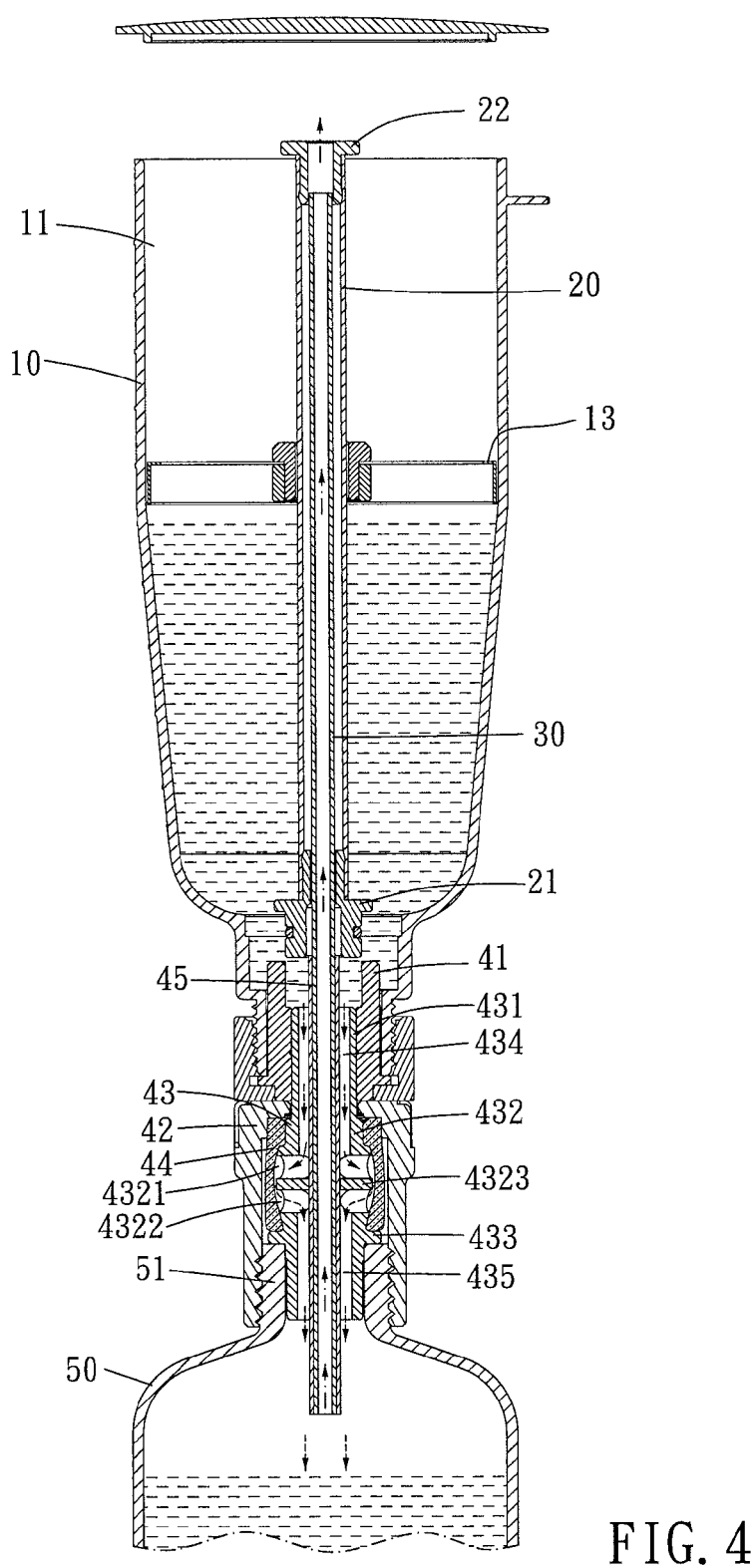
FIG. 4 is a profile of the present invention during operation.
Figure 5:
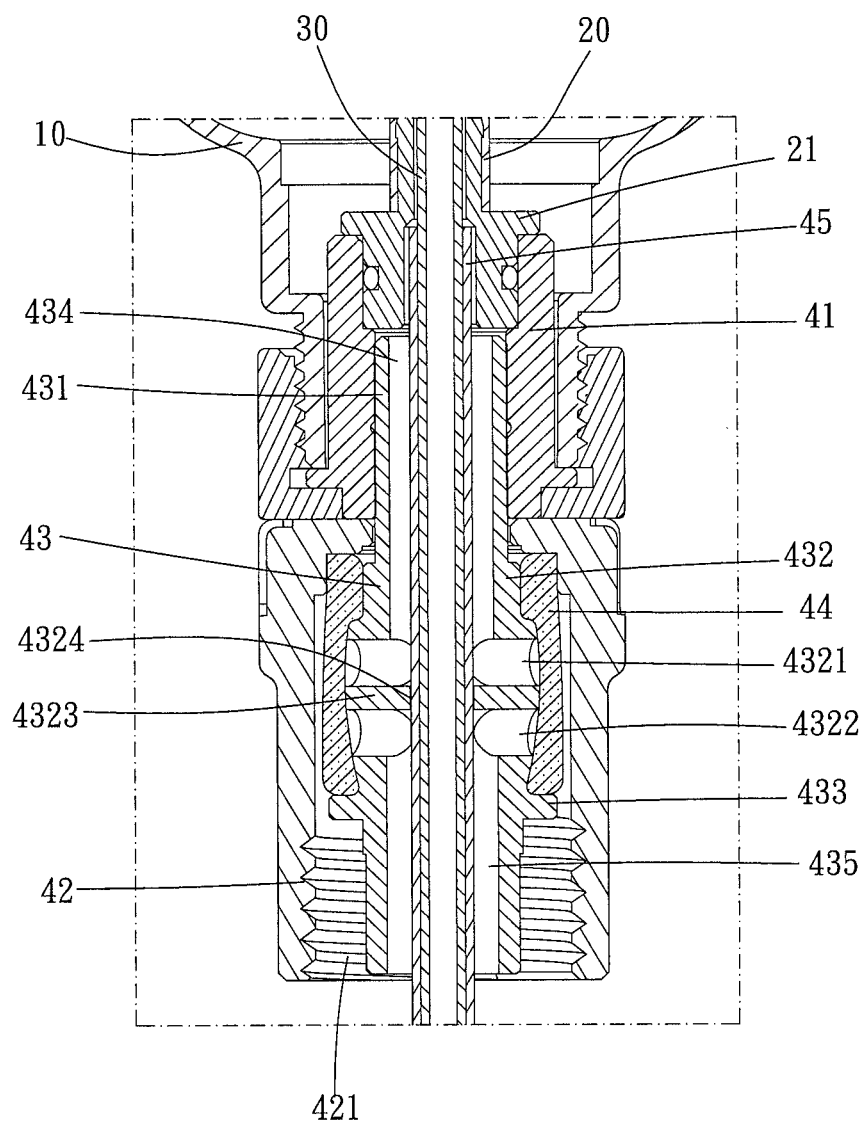
FIG. 5 is a partial enlargement of FIG. 3.
Figure 6:
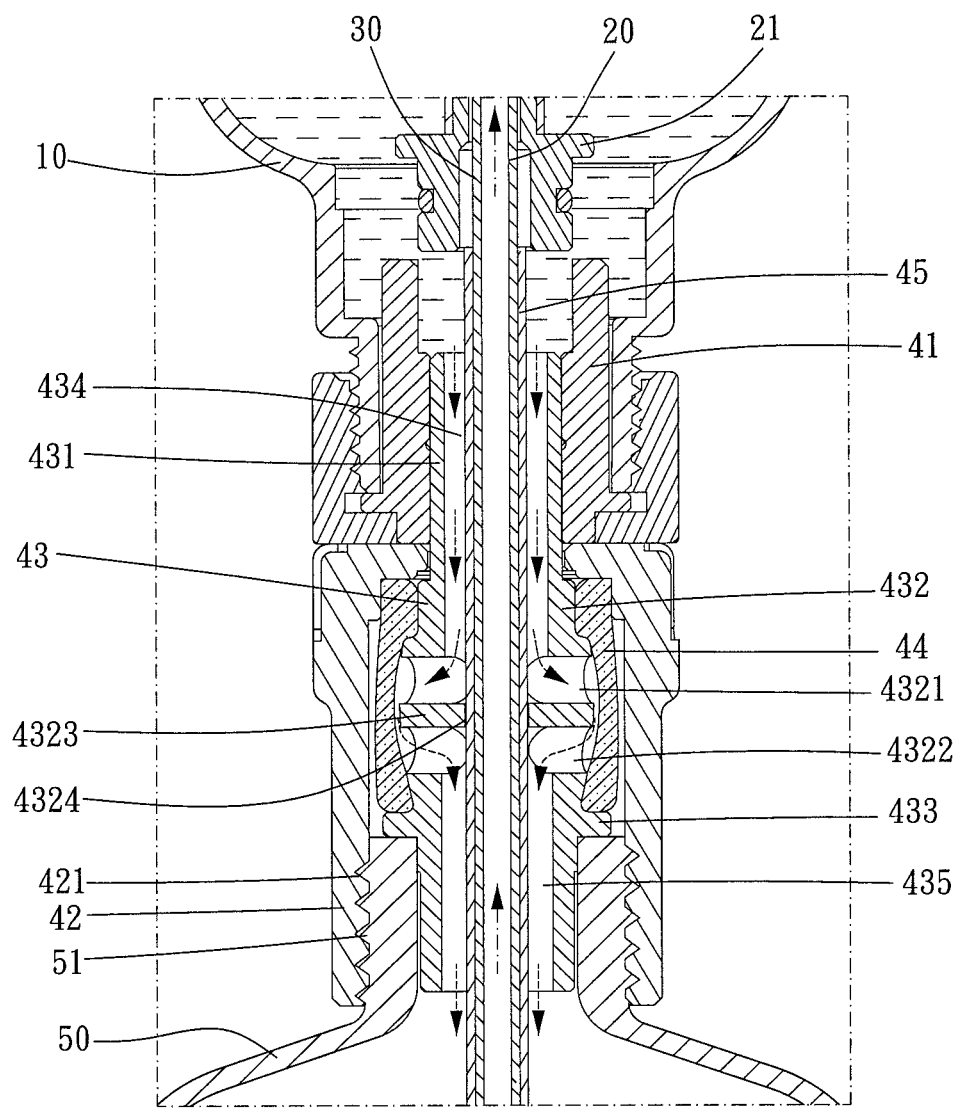
FIG. 6 is a partial enlargement of FIG. 4.

In use, referring to FIG. 3 and FIG. 5, make the stopping portion 21 of the stopper 20 plugs the sleeve member 41, and fill the receiving space 11 with diesel exhaust fluid. At this time, the elastic sleeve 44 is not deformed yet, so the upper channel 434 discommunicates with the lower channel 435. The fluid in the receiving space 11 can not flow through the connector 40 due to the stopping portion 21 and the elastic sleeve 44. Please refer to FIG. 4 and FIG. 6, cover the opening neck 51 of the container 50 with the outer sleeve 42 so that the external threads 511 of the opening neck 51 are screwed with the internal threads 421 of the outer sleeve 42. During screwing, the top end of the opening neck 51 touches the pushing section 433 of the tube member 43 and further pushes it upward. Thereby, the elastic sleeve 44 is deformed outward, and a gap is formed between the tube member 43 and the elastic sleeve 44. The outlet hole 4321 and the inlet hole 4322 communicate with each other via the gap. Thus, the upper channel 434 communicates with the lower channel 435. Thereafter, hold the top end 22 of the stopper 20 and move it up to make the stopping portion 21 leave the sleeve member 41. Thereby, fluid in the receiving space 11 can flow into the container 50 via the connector 40. After injection, make the stopping portion 21 plug the sleeve member 41 again, and remove the outer sleeve 42 from the container 50.

In conclusion, the injection device of the present invention provides double anti-leaking mechanism to avoid fluid leaking when it has not been completely installed on the container. In addition, it is possible to open or shut the opening easily when the connector has been installed on the container.

What is claimed is:

1. An injection device for diesel exhaust fluid, including:
    a cylinder, enclosing a receiving space, the cylinder having a top end and a bottom end, the cylinder having an opening at the bottom end, a longitudinal direction being defined by the top end and the bottom end;
    a stopper, being hollow and pipe-shaped, having a stopping portion and a top portion at two opposite ends thereof, the stopper being arranged in the receiving space and being movable along the longitudinal direction, the stopping portion selectively plugging the opening of the cylinder so that fluid in the receiving space is unable to flow out via the opening;
    an air tube, being inserted through the stopper and the opening of the cylinder to communicate with exterior, the air tube being fixed to a portion of the cylinder near the opening so that the air tube does not move with the stopper;
    a connector, the connector being arranged at the opening of the cylinder, the stopping portion of the stopper selectively plugging the connector;
    wherein the connector includes a sleeve member, a tube member, an elastic sleeve, a guiding tube, and an outer sleeve;
    the sleeve member is tube-shaped to plug in the opening of the cylinder, a top portion of the sleeve member is adapted for the stopping portion of the stopper to plug;
    the tube member is tube-shaped and has an insertion section and a pushing section at two opposite ends thereof, the tube member further has a hole section between the insertion section and the pushing section, the insertion section is inserted into a bottom portion of the sleeve member, the hole section is formed with at least one outlet hole and at least one inlet hole, the outlet hole is closer to the insertion section than the inlet hole is, the inlet hole is closer to the pushing section than the outlet hole is, the hole section has a partitioning plate therein between the outlet hole and the inlet hole, the partitioning plate is formed with a through hole at a center thereof;
    the guiding tube is inserted through and fixed to the through hole, the air tube is inserted through the guiding tube, an upper channel is defined in the insertion section, a lower channel is defined in the pushing section, the upper channel communicates with the outlet hole, the lower channel communicates with the inlet hole;
    the elastic sleeve is hollow, an intermediate portion of the elastic sleeve is deformable outward when a force along a longitudinal direction of the elastic sleeve is applied to the elastic sleeve, the elastic sleeve is sleeved onto the hole section of the tube member to block the outlet hole and the inlet hole, an end of the elastic sleeve abuts against the pushing section of the tube member, the outer sleeve is sleeved onto the tube member and the elastic sleeve, when an opening neck of a container is inserted into the outer sleeve to push the pushing section toward the cylinder, the elastic sleeve is deformed to release the outlet hole and the inlet hole so that the outlet hole communicates with the inlet hole via a gap between the elastic sleeve and the tube member.

2. The injection device for diesel exhaust fluid of claim 1, further including a restriction rack, the restriction rack being formed with a restriction hole on a center thereof, a restriction portion being sleeved onto the stopper, the restriction portion plugging the restriction hole and being positioned in the restriction hole, the stopper being slidable with respect to the restriction portion.

3. The injection device for diesel exhaust fluid of claim 1, wherein an inner wall of an end of the outer sleeve away from the cylinder is formed with internal threads.

4. The injection device for diesel exhaust fluid of claim 1, wherein the pushing section has an annular flange, an end of the elastic sleeve abuts against the annular flange.

5. The injection device for diesel exhaust fluid of claim 1, wherein an inner wall of the elastic sleeve is sphere-shaped.

6. The injection device for diesel exhaust fluid of claim 1, wherein the elastic sleeve is made of rubber.

7. The injection device for diesel exhaust fluid of claim 1, wherein the guiding tube extends to the top portion of the sleeve member, a bottom of the stopping portion of the stopper is formed with an annular groove, the annular groove surrounds the air tube, the guiding tube is inserted into the annular groove when the stopper plugs the sleeve member.

\* \* \* \* \*